UNITED STATES PATENT OFFICE.

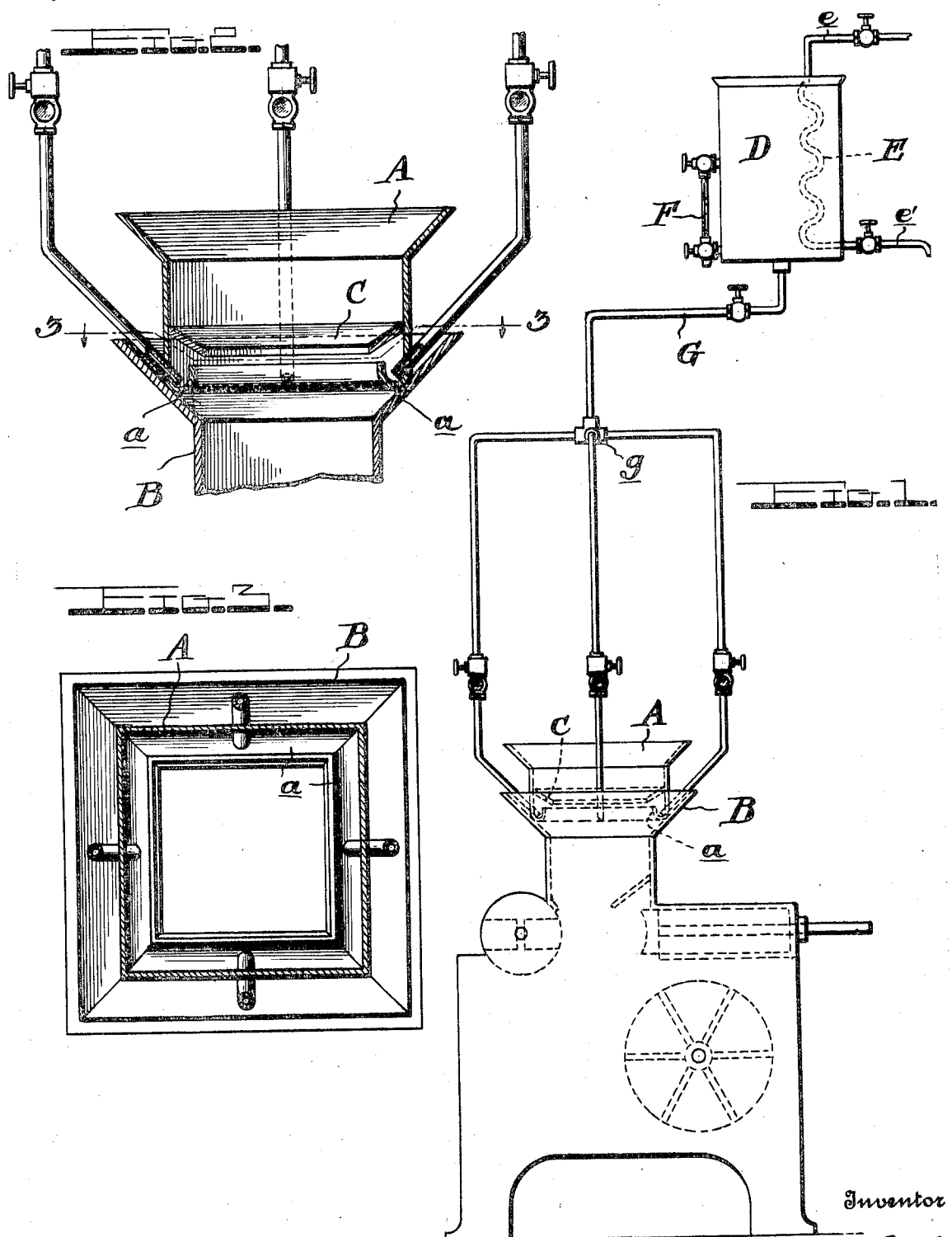

CYRUS HOYT HEILIG, OF YORK, PENNSYLVANIA.

OILING DEVICE FOR DOUGH-DIVIDER MACHINES.

1,139,181.  Specification of Letters Patent.  Patented May 11, 1915.

Application filed October 24, 1914. Serial No. 868,440.

*To all whom it may concern:*

Be it known that I, CYRUS HOYT HEILIG, a citizen of the United States, residing at York, in the county of York and State of Pennsylvania, have invented certain new and useful Improvements in Oiling Devices for Dough-Divider Machines; and I hereby declare that the following is a full, clear, and exact description thereof, reference being had to the accompanying drawings, which form part of this specification.

This invention relates to machines or apparatus for dividing dough and other plastic material, and more particularly to devices for oiling or greasing the hoppers and pockets of machines for dividing and molding dough for bakers' use in making bread.

In using machines or apparatus of the character referred to, oiling or greasing of the dough divider hopper is performed entirely by hand, which is time-consuming, troublesome and expensive, and also dangerous, and unsatisfactory, for unless the dough divider hopper is properly greased or oiled the dough will not flow into the hopper properly and will stick to the walls of the hopper and pockets and cause inaccurate scaling and also injury to the machine. The efficiency of the machine depends upon the proper greasing of the dough divider hopper and pockets, as without proper greasing the machine is practically worthless. Too much grease or oil is almost as bad as not enough, as it is apt to throw small pieces of dough when scaling off, or in other words, weigh light and heavy pieces.

The objects of my invention are to provide means for automatically oiling or greasing the hopper and pockets of a machine or apparatus of the character referred to while the plastic material or dough is running through the machine, and to avoid the labor, trouble, expense and danger incident to oiling by hand. To this end I provide means whereby the oil is fed through sight feeds or valves used to control the amount of oil going into a trough or reservoir from which the oil is conducted, preferably by overflow, into the dough divider hopper, and the dough in the hopper carries or forces the oil or grease into the dough divider pockets, so that the oil is effectually and evenly distributed on all sides of the hopper and also in the pockets; and being under control at all times by sight feeds or valves, the operator in charge can see at a glance the amount of oil going into the reservoir and regulate the amount delivered to the divider hopper as desired.

The invention will first be hereinafter more particularly described, with reference to the accompanying drawings, which are to be taken as a part of this specification, and then pointed out in the claims at the end of the description.

In said drawings: Figure 1 is a side elevation of an apparatus for dividing and molding dough having my improved oiling or greasing device applied thereto; Fig. 2 is a vertical sectional elevation of the upper portion of the dough dividing apparatus with my oiling device mounted thereon, and Fig. 3 is a section taken on the line 3—3 of Fig. 2.

Referring to said drawings, in which the same letters of reference are used to denote corresponding parts in different views, the letter A denotes a suitable hopper mounted within or upon the hopper B of a dough dividing machine. The hopper A is preferably constructed of metal with a trough or distributing device $a$ at its lower end formed integral therewith, and shaped to conform to the interior or underlying surface of the dough divider hopper upon which it rests. Said distributing device however may be formed separately and bolted or otherwise secured to the neck of the hopper A, though it is preferably in the form of a trough adapted to distribute the oil or grease by overflow therefrom over its inturned edge, but other forms, such as a perforated pipe, may be employed, and may be formed as a continuation of or attached to the lower end of a suitable supply pipe or pipes. Within the hopper A, above the trough or distributing device $a$, is placed a beveled or downwardly inclined plate C which will shed or direct the dough placed in said hopper in a downward direction and prevent contact of the dough with the edge of the trough or distributing device below said plate. The upturned edge of the trough-like distributing device is slightly separated from the inclined plate C so as to provide a vent or passage for the oil or grease which may overflow and run into the dough divider hopper and down along the walls thereof to be forced by the dough into the usual pockets with reciprocating plungers by which the mass of dough or other plastic material fed into the hopper A is divided into blocks of the desired size and weight and ejected and deposited upon an endless conveyer or other instrumentality such as is ordinarily employed in machines for dividing and molding dough.

As the dough dividing machine forms no part of my present invention, which is applicable to machines of different types, it is thought to be unnecessary to illustrate or describe any particular type of machine, one type being indicated partly in full and partly in dotted lines and having a suitable hopper upon which my improved oiling or greasing device is mounted.

The letter D denotes a tank for supplying oil or grease by gravity to the distributing device $a$. For the purpose of keeping the oil or grease within the tank D at a suitable temperature to adapt it to flow freely therefrom in cold as well as warm weather, a coiled or other suitable pipe E is secured within the tank and provided with a valve-controlled inlet pipe $e$ and a valve-controlled outlet or drip-pipe $e'$, whereby steam or other heating fluid may be caused to pass through the coil in contact with the contents of the tank when desired. The tank D is also provided with a suitably valved glass tube or gage F through which the liquid in the tank may rise or fall to enable the operator to ascertain the level of the oil in the tank and determine when the supply is getting low or needs replenishing. From the tank D a pipe or oil conduit G having a plurality of branches may lead downwardly to the trough $a$ or other distributing device. In the form shown, said pipe or conduit G has a union $g$ from which four branches lead to the distributing device, one at each side of the square hopper; each branch being provided with a sight-feed or valve whereby the supply of oil or grease can be cut off or turned on at will and the quantity flowing through the valve increased or diminished as desired. But it will be understood of course that a greater or less number of branches may be employed, and that their delivery ends may be located at any suitable point for discharging the grease or oil to the best advantage, according to the shape and size of the hopper and machine parts to be oiled or greased.

The advantages of a greasing or oiling device of the character described are obvious. By its use the scaling will be uniform and accurate and more bread will be produced from a given quantity of flour, because of the accurate scaling; and owing to proper lubrication of the hopper and pockets the life of the machine will be lengthened, and less power will be required than heretofore to operate it; furthermore, nicer and better bread will be produced as I do not "punish" the dough as much when the hopper and pockets are properly greased, and the time and labor of an operator will be saved, while the danger incident to greasing by hand will be avoided. My device will also effect a saving in oil or surplus grease which heretofore has been unavoidably in greater or less quantity allowed to run on the floor or on the machine when greased or oiled as heretofore by hand, as I put the grease or oil where it is all used up in the machine and none allowed to waste.

The operation of the apparatus will be readily understood from the foregoing description when taken in connection with the accompanying drawings. The tank D having been filled with any suitable oil or grease, such as cotton seed oil, lard or lard oil, the valves in the main and branch pipes leading to the distributing device are properly adjusted to permit the desired quantity of oil to flow therethrough, and a suitable quantity of dough being placed in the hopper A will drop by gravity into the dough-divider hopper as the oil or grease flows in regulated quantity into the distributing device. The oil overflowing said device will flow into and down the sides of the dough-divider hopper, finding its way into or being forced by the dough into the pockets containing the usual reciprocating plungers for ejecting the dough in charges or blocks of the desired size and weight upon a traveling belt or other means employed for delivering the divided dough where it is desired for use. So long as the machine is kept in operation it will be automatically greased or oiled without further attention of the operator than to see that the desired quantity is being fed to the machine. At the end of the operation the supply of oil may be cut off by closing the main valve until it is desired to repeat the operation, whereupon said main valve may be again opened and the operation repeated. If desired any one or more of the valves in the branch pipes may be partially opened or closed at will, for the purpose of delivering a greater or less quantity of oil through the different branches.

It will be understood, of course, that my improved oiling device is adapted for application to any suitable apparatus for dividing and molding dough or other plastic material, such machines or apparatus being well known in the art, and while I have shown a dough-divider hopper which is square in cross-section, it will be understood, of course, that my invention may be embodied in various forms for application to hoppers of other forms, having two, three or more sides, and either square, round or angular in form, and that the dough and oil hopper and associated parts of the oiling device may be varied in form to meet different requirements or the desires of the manufacturer or user, without departing from the spirit and scope of my invention.

What I claim as new and desire to secure by Letters Patent of the United States is:

1. An oiling device for a dough-divider hopper comprising a source of supply, a receiver within the hopper, and a conduit leading from said source to said receiver; said receiver being adapted to distribute the oil by overflow therefrom upon the inner side of the hopper.

2. An oiling device for a dough-divider hopper comprising a suitable source of supply arranged above said hopper, means for distributing the oil upon the inner side of said hopper, and a conduit leading from said source to said distributer for supplying oil or grease thereto by gravity, together with means for regulating the quantity of oil delivered to said distributer.

3. In combination with an apparatus for dividing and molding dough or other plastic material, a hopper adapted to be mounted upon the dough-divider hopper and having a trough-like oil receptacle adapted to overflow into the dough-divider hopper, and means for supplying oil or grease by gravity to said receptacle.

4. In combination with an apparatus for dividing and molding dough or other plastic material, a hopper adapted to be mounted upon the dough-divider hopper and having a trough-like oil receptacle adapted to overflow into the dough-divider hopper, and means for supplying oil or grease by gravity to said receptacle, together with means for regulating the quantity of oil flowing into said receptacle.

5. In combination a dough-divider hopper having a flaring mouth, a hopper having a trough-like portion at its lower end resting upon the mouth of the dough-divider hopper, an inclined plate overlying the inner edge of said trough-like part, and means for supplying oil or grease thereto by gravity, the contents of said trough-like part being adapted to overflow into the mouth of the dough-divider hopper.

6. In combination, a hopper mounted upon a dough-divider hopper and having an oil distributing device at its lower end resting within the upper portion of the dough-divider hopper, and means for supplying oil or grease to said distributing device by gravity.

7. In combination with a dough-divider hopper, a second hopper mounted thereon having a distributing device at its lower end resting upon the inner sides of the dough divider hopper, an oil tank, and a conduit leading from said tank to said distributing device and having a plurality of branches for delivering oil to said distributing device at opposite sides of the mouth of the dough-divider hopper.

8. In combination with a dough-divider hopper, a second hopper mounted thereon having a distributing device at its lower end within the dough-divider hopper, a supply tank, and a conduit leading from said tank to said distributing device and having a plurality of branches for delivering oil to said distributing device at opposite sides of the mouth of the dough-divider hopper, each branch of said conduit being provided with a sight-feed or valve for controlling the quantity of oil passing therethrough.

9. In combination with a dough-divider hopper, a second hopper mounted thereon having a distributing device at its lower end within the dough-divider hopper, a supply tank, and a conduit leading from said tank to said distributing device and having a plurality of branches for delivering oil to said distributing device at opposite sides of the mouth of the dough-divider hopper, each branch of said conduit being provided with a sight-feed or valve for controlling the quantity of oil passing therethrough, together with a main valve for cutting off the supply of said branches.

10. In combination with a dough-divider hopper, a second hopper having a distributing device at its lower end resting upon said dough-divider hopper, an inclined plate overlying said distributing device, and means for automatically supplying oil to said device.

11. In combination with a dough-divider hopper, a hopper mounted thereon having means at its lower end for delivering oil uniformly and evenly upon the inner sides of the dough-divider hopper, an inclined plate overlying said distributing device, and means for automatically supplying oil to said device.

12. A hopper having an oil distributing device adapted to be mounted upon a dough-divider hopper, in combination with a supply tank arranged above said hopper, and a conduit leading from said tank to said distributing device for supplying oil or grease thereto by gravity, said tank having fluid circulating means therein; and a sight-gage thereon.

13. In combination with a dough divider hopper, a receptacle for oil or grease mounted thereon, and means whereby the oil or grease is allowed to gravitate to said receptacle; said receptacle being adapted to distribute the oil or grease over the inner surface of the hopper by overflow therefrom onto the inner surface of the hopper.

In testimony that I claim the foregoing as my own, I affix my signature in presence of two witnesses.

CYRUS HOYT HEILIG.

Witnesses:
 NOAH C. MAY,
 JOHN C. DEETER.